US005552831A

United States Patent [19]

Machida et al.

[11] Patent Number: 5,552,831
[45] Date of Patent: Sep. 3, 1996

[54] DIGITAL VIDEO SIGNAL DECODING APPARATUS AND PRESUMED MOTION VECTOR CALCULATING METHOD

[75] Inventors: Yutaka Machida; Takeshi Yukitake, both of Yokohama, Japan

[73] Assignee: Matsushita Electric Industrial Co., Ltd., Osaka, Japan

[21] Appl. No.: 467,719

[22] Filed: Jun. 6, 1995

Related U.S. Application Data

[63] Continuation of Ser. No. 83,779, Jun. 30, 1993, abandoned.

[30] Foreign Application Priority Data

Jul. 3, 1992 [JP] Japan .................................. 4-176609

[51] Int. Cl.$^6$ ..................................... H04N 7/32
[52] U.S. Cl. ........................... 348/416; 348/699
[58] Field of Search ................................. 348/402, 413, 348/416, 699, 384, 390, 407, 409–412, 420; H04N 7/130, 7/137

[56] References Cited

U.S. PATENT DOCUMENTS

| | | | |
|---|---|---|---|
| 4,727,422 | 2/1988 | Hinman | 348/416 |
| 4,862,259 | 8/1989 | Gillard et al. | 348/416 |
| 4,862,264 | 8/1989 | Wells et al. | 348/416 |
| 4,901,145 | 2/1990 | Harradine et al. | 348/699 |
| 5,027,203 | 6/1991 | Samad et al. | 348/699 |
| 5,036,393 | 7/1991 | Samad et al. | 348/699 |
| 5,067,015 | 11/1991 | Combridge et al. | |
| 5,198,901 | 3/1993 | Lynch | 348/413 |

FOREIGN PATENT DOCUMENTS

0521529A2  1/1993  European Pat. Off. .
3-136595    6/1991  Japan .

OTHER PUBLICATIONS

G. Aartsen et al.; "Error Resilience of a Video Codec for Low Bitrates"; ICASSP '88, International Conference on Acoustics, Speech and Signal Processing, vol. II; Apr. 1988; IEEE; pp. 1312–1315.

P. Haskell et al.; "Resynchronization of Motion Compensated Video Affected by ATM Cell Loss"; ICASSP '92, International Conference on Speech, Acoustics and Signal Processing; vol. III; Mar. 1992; pp. III.545–III.548.

M. Wada; "Selective Recovery of Video Packet Loss using Error Concealment"; IEEE Journal on Selected Areas in Communication; vol. 7, No. 5, Jun. 1989; pp. 807–814.

*Primary Examiner*—Tommy P. Chin
*Assistant Examiner*—Richard Lee
*Attorney, Agent, or Firm*—Watson Cole Stevens Davis, P.L.L.C.

[57] ABSTRACT

A digital video signal decoding apparatus has a memory for storing motion vectors which have been decoded by a decoder, and a motion vector calculating circuit for calculating a presumed motion vector from the motion vectors stored in the memory, whereby, even if part of a bit stream has been lost and each of pixel blocks which have been lost accordingly cannot be decoded, each of the lost pixel blocks is filled in by a corresponding pixel block in a preceeding frame which has been motion-compensated through a motion compensation circuit by using the presumed motion vector, thereby preventing degradation of the picture quality at that pixel block portion.

2 Claims, 3 Drawing Sheets

DIGITAL VIDEO SIGNAL DECODING APPARATUS AND PRESUMED MOTION VECTOR CALCULATING METHOD

This application is a continuation of application Ser. No. 08/083,779, filed Jun. 30, 1993 (abandoned).

BACKGROUND OF THE INVENTION

The present invention relates to a decoding apparatus and a presumed motion vector calculating method for digital video signals which are utilized in television telephones, tele-conferences and so on.

In recent years, with the rapid development of television telephones and tele-conference apparatuses, a demand has arisen for a method of preventing degradation of the picture quality caused by transmission errors, particularly in a digital video signal decoding apparatus.

Generally, a digital video signal coding apparatus first performs motion compensation for each of the pixel blocks (for example, 16×16 pixels) which constitute the previous frame in order to remove correlation in time, and calculates a difference value of each pixel block between the previous frame and the current frame. In this case, the amount of information relating to the difference values is much smaller than the amount of information relating to the current frame. Then, the difference values and motion vectors used for the motion compensation are coded, and binary codes are outputted.

On the other hand, a digital video signal decoding apparatus decodes the binary codes outputted from the coding apparatus to obtain a difference value of each pixel block between the motion-compensated previous frame and the current frame, and a motion vector used for the motion compensation for that pixel block. The decoding apparatus is provided with a frame memory for storing the previous frame, and pixel blocks, which constitute the previous frame stored in the frame memory, are motion-compensated by using corresponding motion vectors. The difference values are added to the motion compensated pixel blocks in the previous frame to thereby reproduce the current frame. The reproduced current frame is stored in the frame memory. In this manner, the decoding apparatus allows the current frame to be reproduced only by the use of the difference values of the respective pixel blocks between the previous frame and the current frame and the motion vectors.

A conventional digital video signal decoding apparatus will be explained below with reference to FIG. 1.

As shown in FIG. 1, a conventional digital video signal decoding apparatus is composed of an input terminal 101, a decoder 102, a motion compensation circuit 103, a frame memory 104, an adder 105, and an output terminal 106.

Next, the relation between the respective constituent elements and the operation of the apparatus shown in FIG. 1 will be explained.

When a binary code is first supplied from a coding apparatus to the input terminal 101, the decoder 102 decodes a difference value of each pixel block between the previous frame and the current frame and a motion vector which was used for motion compensation of the pixel block in the previous frame. Then, the motion compensation circuit 103 uses the motion vectors inputted from the decoder 102 to motion-compensate the respective pixel blocks in the previous frame read out from the frame memory 104. The adder 105 adds the difference values of the respective pixel blocks between the previous frame and the current frame outputted from the decoder 102 to the values of the pixel blocks in the motion-compensated previous frame outputted from the motion compensation circuit 103 to reproduce the current frame. The reproduced current frame is delivered from the output terminal 106 and stored in the frame memory 104 for use in the decoding of a next frame.

Thus, the conventional decoding apparatus described above, as an example, can decode a video signal from a small amount of information including the difference values of the respective pixel blocks between the previous frame and the current frame and the motion vectors, and hence efficient video signal transmission can be accomplished.

However, in the above-described conventional structure, if a part of a bit stream is lost on a transmission path for some reason, a pixel block may appear in which the difference value between the previous frame and the current frame and the motion vector cannot be decoded, whereby pixels in such a pixel block in the previous frame which have not been subjected to motion compensation are displayed in a portion of the frame, causing a problem that the picture quality is greatly degraded, particularly in a moving portion.

SUMMARY OF THE INVENTION

The present invention has been made to solve the above problem inherent to the prior art, and the object of the present invention is to provide a digital video signal decoding apparatus and a presumed motion vector calculating method which effectively deal with the case where part of a bit stream is lost and a corresponding pixel block cannot be decoded, and which are capable of preventing degradation of the picture quality at that pixel block portion.

To achieve the above object, the digital video signal decoding apparatus of the present invention is provided with a memory for storing the values of motion vectors after they have been decoded so that, even if part of a bit stream is lost and accordingly a corresponding pixel block cannot be decoded, this pixel block is replaced by a corresponding pixel block in the previous frame which has been motion-compensated by using a presumed motion vector calculated from the motion vectors stored in the memory, thereby making it possible to prevent degradation of the picture quality at that pixel block portion.

Further, the presumed motion vector calculating method counts the occurrence frequency of the values of N motion vectors stored in the memory in the x- and y-directions independently, and designates the motion vector of the largest frequency as a presumed motion vector.

Another presumed motion vector calculating method according to the present invention adaptively changes the value of N when counting the occurrence frequency of the values of N motion vectors in the x- and y-directions independently in the above stated presumed motion vector calculating method.

With the configuration described above, the present invention replaces a pixel block, which cannot be decoded, by a corresponding pixel block in the previous frame which has been motion-compensated by using a presumed motion vector, thereby preventing degradation of the picture quality.

The presumed motion vector calculating method of the present invention, on the other hand, employs the principle of making a decision by majority in selecting a presumed motion vector from N motion vector values, so that a most reliable presumed motion vector can be selected from the N motion vectors.

Further, a reliable motion vector can always be selected by adaptively changing the value of N so as to improve the picture quality.

In addition, this motion vector calculating method can be used in a presumed motion vector calculating method applicable to digital video signal decoding apparatus.

DESCRIPTION OF THE PREFERRED EMBODIMENTS

One embodiment of the present invention will hereinafter be described with reference to the accompanying drawings.

Figure 1:
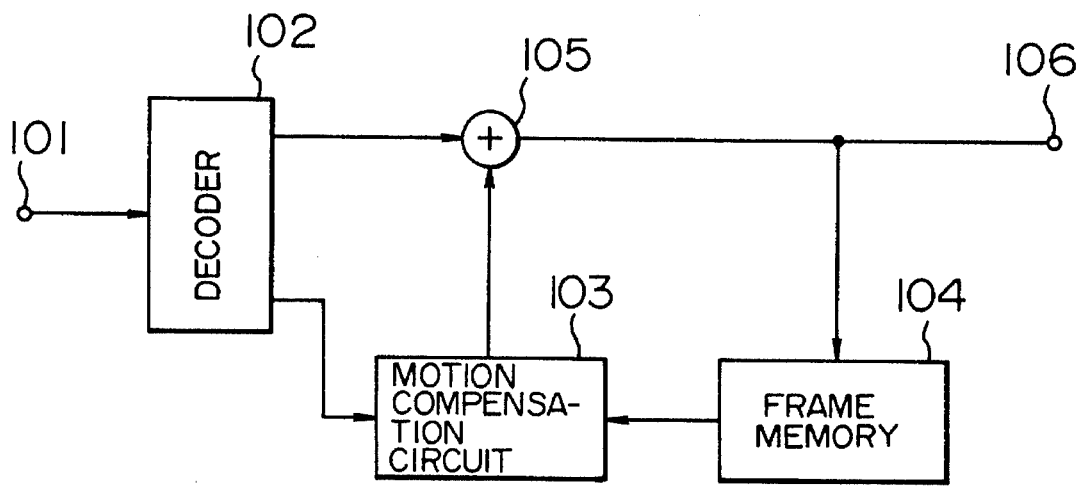
FIG. 1 is a block diagram showing a conventional digital video signal decoding apparatus.
Figure 2:
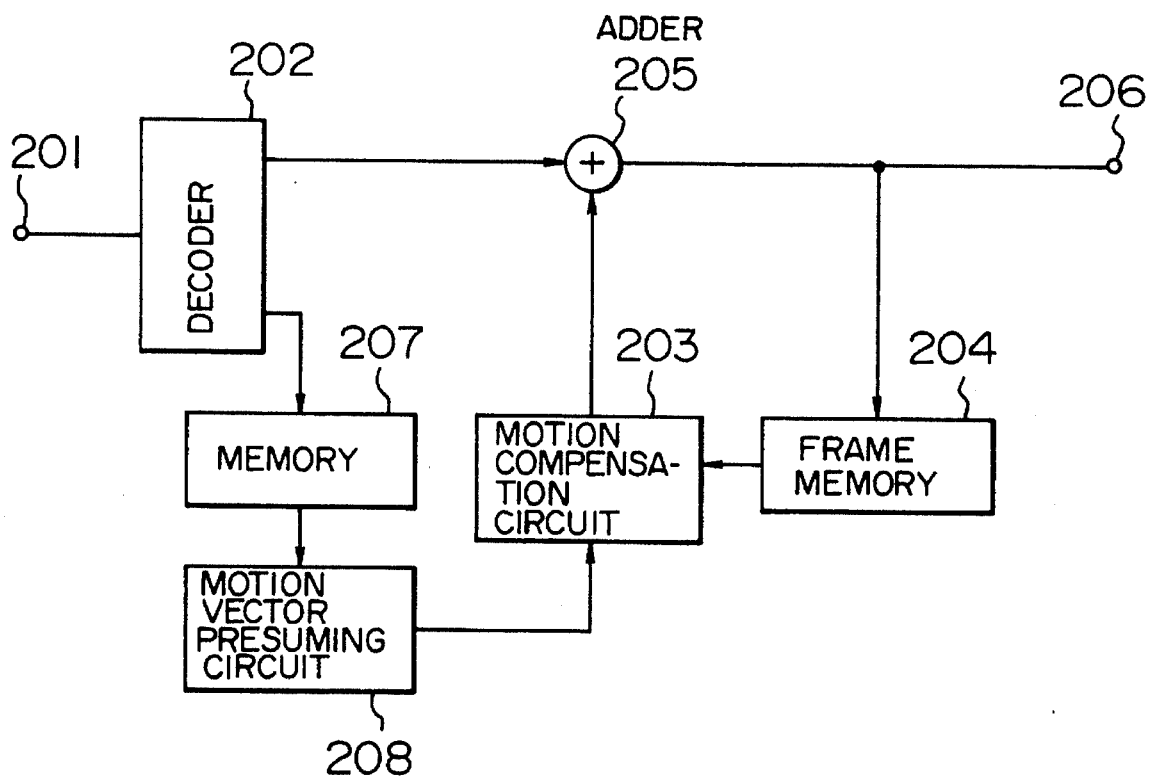
FIG. 2 is a block diagram showing a digital video signal decoding apparatus according to one embodiment of the present invention.

As shown in FIG. 2, a digital video signal decoding apparatus of the present embodiment is composed of an input terminal 201, a decoder 202, a memory 207, a motion vector presuming circuit 208, a motion compensation circuit 203, a frame memory 204, an adder 205, and an output terminal 206.

The operation of the decoding apparatus will next be explained.

First, when a binary code sequence (hereinafter abbreviated as "bit stream") outputted from a coding apparatus is supplied from the input terminal 201, the decoder 202 decodes a difference value of each pixel block between the previous frame and the current frame, and a motion vector used for motion compensation of the pixel block of the previous frame. The decoder 202 stores the decoded motion vector in the memory 207. It should be noted, however, that, if the difference value and the motion vector cannot be decoded for some reason such as the occurrence of a lost part of the bit stream, the decoder 202 does not output anything, so that no value is stored in the memory 207. It is assumed here that the memory 207 has a capacity of storing, for example, motion vectors per one-frame.

Next, the motion vector presuming circuit 208 reads a motion vector for each pixel block stored in the memory 207, and outputs a motion vector, if one for the corresponding pixel block exists; otherwise it outputs a presumed motion vector.

The motion compensation circuit 203 utilizes a motion vector inputted thereto from the motion vector presuming circuit 208 to motion-compensate each of the pixel blocks which constitute the previous frame read out from the frame memory 204. The adder 205 adds the difference values of the respective pixel blocks between the previous frame and the current frame outputted from the decoder 202 to the corresponding pixel blocks in the motion-compensated previous frame outputted from the motion compensation circuit 203 to reproduce the current frame. The reproduced current frame is delivered from the output terminal 206 and simultaneously stored in the frame memory 204 for use in decoding the next frame.

As described above, the digital video signal decoding apparatus of the present invention replaces a pixel block, which cannot be decoded, by a corresponding pixel block in the previous frame, which has been motion-compensated by using a presumed motion vector, to thereby prevent degradation of the picture quality.

Next, a presumed motion vector calculating method, implemented in the motion vector presuming circuit 208, will be explained with reference to FIGS. 3 and 4. In the digital video signal decoding apparatus of the present embodiment, a pixel block which cannot be decoded (hereinafter referred to as a "lost pixel block") is replaced by a corresponding pixel block in the previous frame which has been motion-compensated by using a presumed motion vector. Therefore, the closer the presumed motion vector value is to an original motion vector value of the lost pixel block, the less conspicuous degradation of the picture quality of the lost pixel block portion becomes.

Figure 3:
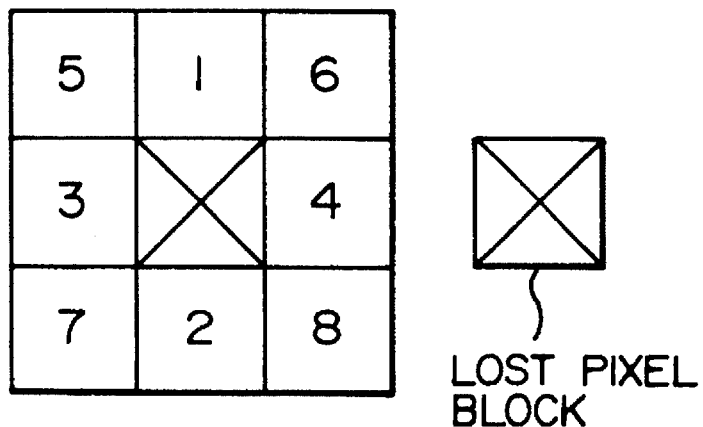
FIG. 3 is a diagram showing an arrangement of pixel blocks used for explaining a presumed motion vector calculating method according to the present invention.

The motion vector presuming circuit 208 calculates a presumed motion vector, for example, through the following procedure:

(1) Motion vector values of eight decodable pixel blocks around a lost pixel block, as shown in FIG. 3, for example, are examined in the x- and y-directions independently, and these motion vector values are designated $Vx(n)$ and $Vy(n)$, respectively, where n designates an index corresponding to the position of each decodable pixel block shown in FIG. 3 and may take a value in a range expressed by $1 \leq n \leq 8$ in this example.

(2) For the range $1 \leq n \leq 8$, the occurrence times are counted for $Vx(n)$ and $Vy(n)$. More specifically, the occurrence frequency $ax(Vx(n))$ of $Vx(n)$ is calculated for all of n values as:

$$ax(Vx(n))=ax(Vx(n))+1$$

Likewise, the occurrence frequency $ay(Vy(n))$ of $Vy(n)$ is calculated as:

$$ay(Vy(n))=ay(Vy(n))+1$$

(3) Each of the motion vector values $Vx(n)$ and $Vy(n)$, which has the largest occurrence frequency $ax(Vx(n))$ and $ay(Vy(n))$ is adopted as the presumed motion vector value.

Figure 4:
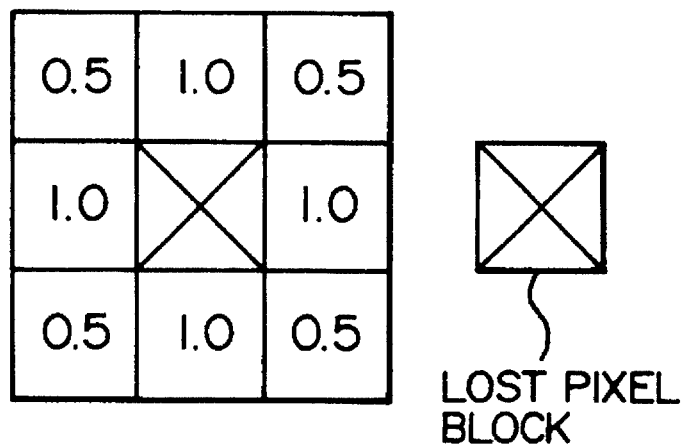
FIG. 4 is a diagram showing pixel blocks used for explaining a different presumed motion vector calculating method according to the present invention.

Also, from the fact that a motion vector of a pixel block located closer to a lost pixel block has a higher probability of presenting a value identical or close to the original motion vector value of the lost pixel block, the occurrence frequencies may be weighted, as shown in FIG. 4, for example, when the presumed motion vector is calculated. When this weighting is performed, the motion vector presuming circuit 208 employs a modified process (2) in the presumed motion vector calculating processes (1), (2) and (3) as described below.

(2) For the range $1 \leq n \leq 8$, weighted occurrence frequencies are calculated for $Vx(n)$ and $Vy(n)$. The weighting coefficient is designated as $w(n)$ which has a larger value at a position located closer to the lost pixel block, as shown in FIG. 4. The weighted occurrence frequency ax(Vx(n)) for Vx(n) is calculated for all of the values of n, as indicated by ax(Vx(n))=ax(Vx(n))+w(n)

Likewise, the weighted occurrence frequency ay(Vy(n)) for Vy(n) is calculated as indicated by ay(Vy(n))=ay(Vy(n))+w(n)

While only one example of the embodiment of the presumed motion vector calculating method has been explained, it is to be understood that this is a mere example, and other motion vectors of pixel blocks shown in FIG. 3 may be used for calculating the presumed motion vector. Also, the values other than those shown in FIG. 4 may be used for the weighting coefficients for the pixel blocks.

Another presumed motion vector calculating method will be next explained with reference to FIGS. 5 and 6. This presumed motion vector calculating method employs a modified process (3) in the above described processes (1), (2) and (3) for calculating a presumed motion vector, as described below for example.

(3) When both of the largest values of the occurrence frequencies ax(Vx(n)) and ay(Vy(n)) exceed a predetermined threshold value (for example, two), the vector values Vx(n) and Vy(n), which maximize the occurrence frequencies ax(Vx(n)) and ay(Vy(n)), respectively, are adopted as the presumed motion vector values. Conversely, if any one or both of the maximum values of the occurrence frequencies ax(Vx(n)) and ay(Vy(n)) has a value of two or less (i.e. equal to or less than the threshold), the presumed motion vector calculating processes (1), (2) and (3) are repeated for motion vector values of 14 decodable pixel blocks located around the lost pixel block, as shown in FIG. 5, for example.

Figure 6:
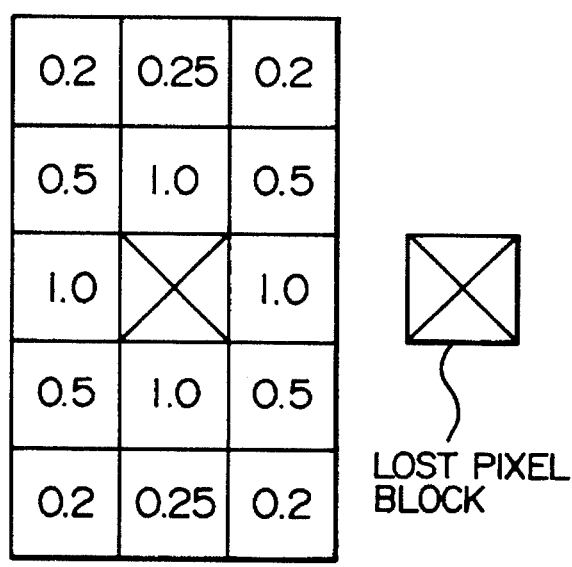
FIG. 6 is a diagram showing pixel blocks used for explaining a further presumed motion vector calculating method according to the present invention.

Further, in the process (2), weighted occurrence frequencies may be calculated by using weighting coefficients as shown in FIG. 6, for example.

Figure 5:
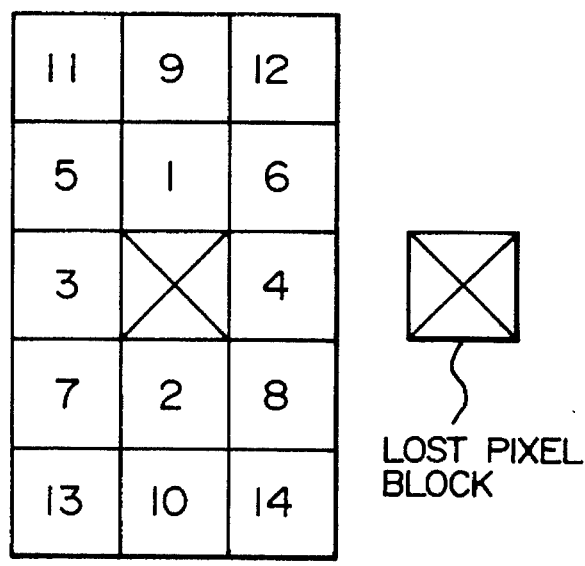
FIG. 5 is a diagram showing pixel blocks used for explaining another presumed motion vector calculating method according to the present invention.

While a different embodiment of the presumed motion vector calculating method has been explained above, it is to be understood that this is a mere example, and any motion vectors of pixel blocks other than those shown in FIG. 5 may be used for calculating the presumed motion vectors. Also, the values other than those shown in FIG. 6 may be used for the weighting coefficients for the pixel blocks.

As described above, since the presumed motion vector calculating method of the present invention employs the principle of making a decision in accordance with a plurality of motion vector values of, for example, eight decodable pixel blocks around a lost pixel block to calculate a presumed motion vector for the lost pixel block, the most reliable one can be selected from the eight motion vectors, for example.

Further, assuming, for example, that eight motion vector values vary so greatly that the decision based on for the eight motion vector values cannot be made, 14 motion vectors, for example, may be used in place thereof for making the decision by majority, thereby making it possible to always select a reliable motion vector.

As is apparent from the foregoing embodiments, according to the digital video signal decoding apparatus of the present invention, degradation of the picture quality can be prevented by replacing a pixel block, which cannot be decoded, by a corresponding pixel block in the previous frame which has been motion-compensated by using a presumed motion vector.

Also, in accordance with the presumed motion vector calculating method of the present invention, since the principle of making a decision by majority is employed in selecting a presumed motion vector from N motion vector values, a most reliable one can be determined from the N motion vectors. Further, when the decision by majority is made for the N motion vectors, the value of N may be adaptively changed, thereby making it possible to always select a reliable motion vector.

According to the present invention, therefore, it is possible to realize excellent digital video signal decoding apparatus and presumed motion vector calculating method which cannot be achieved by the prior art.

We claim:

1. A method of determining a presumed motion vector for a particular frame pixel block of digital signal data comprising plural frame pixel blocks where data relating to said particular frame pixel block are lost during transmission or reception of said digital signal data, said method comprising the steps of:

(a) storing values of N (N>0) decoded motion vectors for said digital signal data in a memory, with respect to x and y directions of said digital signal data, independently for said x direction and said y direction;

(b) determining a frequency of occurrence of said values of said N decoded motion vectors independently for said x direction and said y direction;

(c) selecting a first one of said values of N decoded motion vectors having a largest frequency of occurrence in said x direction and selecting a second one of said values of N decoded motion vectors having a largest frequency of occurrence in said y direction;

(d) if said largest frequency of occurrence in said x direction or in said y direction is less than a threshold value, increasing a value of said number N and repeating said steps (a)–(d) with respect to the increased value of said number N; and (e) determining said presumed motion vector in accordance with said first one and said second one of said values of N decoded motion vectors.

2. A method of determining a presumed motion vector for a particular frame pixel block of digital signal data comprising plural frame pixel blocks where data relating to said particular frame pixel block are lost during transmission or reception of said digital signal data, said method comprising the steps of:

(a) storing values of N (N>0) decoded motion vectors for said digital signal data in a memory, with respect to x and y directions of said digital signal data, independently for said x direction and said y direction;

(b) determining a weighted frequency of occurrence of said values of said N decoded motion vectors independently for said x direction and said y direction; and (c) selecting a first one of said values of N decoded motion vectors having a largest weighted frequency of occurrence in said x direction and selecting a second one of said values of N decoded motion vectors having a largest weighted frequency of occurrence in said y direction;

(d) if said largest weighted frequency of occurrence in said x direction or in said y direction is less than a threshold value, increasing a value of said number N and repeating said steps (a)–(d) with respect to the increased value of said number N; and (e) determining said presumed motion vector in accordance with said first one and said second one of said values of N decoded motion vectors.

* * * * *